US006880092B2

(12) United States Patent
Jauert

(10) Patent No.: US 6,880,092 B2
(45) Date of Patent: Apr. 12, 2005

(54) CONFIGURATION FOR IDENTIFYING A SWITCH POSITION OF A POWER SWITCH

(75) Inventor: Joachim Jauert, Berlin (DE)

(73) Assignee: Francotyp-Postalia AG & Co. KG, Birkenwerder (DE)

( * ) Notice: Subject to any disclaimer, the term of this patent is extended or adjusted under 35 U.S.C. 154(b) by 496 days.

(21) Appl. No.: 09/851,054

(22) Filed: May 8, 2001

(65) Prior Publication Data

US 2001/0039626 A1 Nov. 8, 2001

(30) Foreign Application Priority Data

May 8, 2000 (DE) .................................... 200 08 548 U

(51) Int. Cl.[7] .............................. G06F 1/26; G06F 1/32

(52) U.S. Cl. ....................... 713/300; 713/100; 713/330; 713/340

(58) Field of Search ................................ 713/300, 340; 318/729; 340/644; 307/112, 113, 140

(56) References Cited

U.S. PATENT DOCUMENTS

| | | | | | |
|---|---|---|---|---|---|
| 3,448,287 | A | | 6/1969 | Giammona | |
| 4,352,993 | A | * | 10/1982 | Hannas | 307/112 |
| 4,675,841 | A | | 6/1987 | Check, Jr. et al. | |
| 4,777,479 | A | * | 10/1988 | Hinckley | 340/644 |
| 5,119,212 | A | * | 6/1992 | Mori et al. | 358/474 |
| 5,376,920 | A | * | 12/1994 | Baily | 340/654 |
| 5,592,034 | A | | 1/1997 | Felmus et al. | |
| 5,710,721 | A | | 1/1998 | Rieckhoff et al. | |
| 6,230,273 | B1 | * | 5/2001 | Rieker | 713/300 |
| 6,252,492 | B1 | * | 6/2001 | Frank et al. | 337/365 |
| 6,355,991 | B1 | * | 3/2002 | Goff et al. | 307/140 |

FOREIGN PATENT DOCUMENTS

| | | | | |
|---|---|---|---|---|
| EP | 000327881 A1 | * | 8/1989 | 327/91 |

* cited by examiner

*Primary Examiner*—Rehana Perveen
(74) *Attorney, Agent, or Firm*—Laurence A. Greenberg; Werner H. Stemer; Gregory L. Mayback

(57) ABSTRACT

A configuration for identifying a switch position of a power switch for microprocessor-controlled appliances is provided. A switch connected in parallel with the power switch is to produce a switch-off delay which has no adverse effect on the interrogation of the switch position. The power switch contains two series-connected switches which can be opened or closed only jointly, with one contact of one switch being connected to one of the two live or neutral conductors, and its other contact being connected to a first input of a sensor which, when voltage is applied and the power switch is switched on, passes a measurement current to the second input of the sensor, which is connected to another one of the two live or neutral conductors. On the output side, the sensor transmits an output signal, corresponding to the switch position of the power switch to a microprocessor for the appliance.

12 Claims, 2 Drawing Sheets

CONFIGURATION FOR IDENTIFYING A SWITCH POSITION OF A POWER SWITCH

BACKGROUND OF THE INVENTION

Field of the Invention

The invention relates to a configuration for identifying the switch position of a power switch for microprocessor-controlled appliances with a switch-off delay using a switch connected in parallel with the power switch. The invention is used for microprocessor-controlled appliances and is suitable for franking machines and other mail-processing appliances. The invention avoids premature failure of the power switch.

U.S. Pat. No. 5,592,034 discloses a switch-off delay for a franking machine which is equipped with an ink-jet printing system. The power supply is provided by a primary transformer, which is connected via circuit parts to a secondary transformer. A first switch of a two-pole power switch is connected between the primary and secondary transformers and can be bridged by a parallel-connected power gate, in order to produce a switch-off delay. A jointly operated second switch of the power switch is in this case connected to a microprocessor, in order to signal the switch position of the power switch to the microprocessor. The power switch is connected such that one of its two switches carries only a small current, which can lead to contact deterioration (corrosion) and, in the end, to premature failure, for example as a result of foreign particles in the contact area. If, for the above-mentioned reasons, this current were to be set to a far higher level than is actually required for measuring the switching state, then this would result in a considerably greater power loss in other components which, in the end, would lead to other disadvantages. Alternative use of a special switch with gold contacts for the second switch in the measurement circuit would be too expensive.

SUMMARY OF THE INVENTION

It is accordingly an object of the invention to provide a configuration for identifying a switch position which overcomes the above-mentioned disadvantages of the heretofore-known configurations of this general type and which allows the switch position to be interrogated with little power loss in the other components involved in the interrogation process, and without using a special switch. Furthermore, a switch-off delay is to be achieved through the use of a switch connected in parallel with the power switch, without the interrogations process being adversely affected in consequence.

With the foregoing and other objects in view there is provided, in accordance with the invention, in combination with a microprocessor-controlled appliance operating with a switch-off delay, a configuration for identifying a switch position, including:

a power switch having given switch positions and including a first switch and a second switch, the first switch being connected in series with the second switch;

the first switch and the second switch selectively opening and closing only jointly;

a sensor having a first input, a second input, and an output;

the second input of the sensor to be connected to a first conductor selected from the group consisting of a first live conductor, a second live conductor, and a neutral conductor;

the second switch having a first contact and a second contact, the first contact to be connected to a second conductor selected from the group consisting of the first live conductor, the second live conductor, and the neutral conductor;

the second contact of the second switch being connected to the first input of the sensor for passing a measurement current to the first input of the sensor when a voltage is applied and the power switch is switched on; and a microprocessor operatively connected to the sensor, the output of the sensor transmitting an output signal corresponding to one of the given switch positions of the power switch to the microprocessor.

In other words, there is provided a configuration for identifying the switch position of a power switch for microprocessor-controlled appliances with a switch-off delay through the use of a switch connected in parallel with the power switch, wherein the power switch contains two series-connected switches which can be opened or closed only jointly, with one contact of one switch being connected to one of the two live or neutral conductors, and its other contact being connected to a first input of a sensor which, when voltage is applied and the power switch is switched on, passes a measurement current to the second input of the sensor, which is connected to the associated other one of the two live or neutral conductors, and wherein, on the output side, the sensor transmits an output signal, corresponding to the switch position of the power switch to a microprocessor for the appliance.

The switch position of the power switch can be identified with the aid of a switch of the two-pole power switch and through the use of a sensor. In the configuration according to the invention, a two-pole standard power switch is used, with its two switches connected in series. The configuration of two series-connected switches of this power switch has the advantage that the high inrush current of the power supply flows via all the contacts of the switch. This ensures that the minimum current required for the switching contacts flows and that the contacts do not fail prematurely as a result of contact deterioration. The series-connected first switch is used for decoupling the second switch from the parallel-connected third switch. The interrogation of the switch position of the second switch is thus not influenced by the switch position of the third switch. The latter is preferably in the form of a relay switch.

Since power line voltage is applied, the second switch of the power switch cannot be interrogated directly by the processor, if only for safety reasons. The required withstand voltage for interrogation by a sensor is achieved by an intermediate optocoupler, isolating transformer or similar measures for DC isolation. The invention provides for the sensor to contain signal forming devices and to be connected on the output side to a sensor shift register, which is interrogated by the microprocessor for the appliance.

Both the above-mentioned sensor and sensor shift register and an actuator shift register and a relay assembly actuated by it are provided on a sensor/actuator control board of a franking machine. If the relay assembly is actuated by the microprocessor for the appliance, the relay switch provided in parallel with the power switch is operated without this having any adverse effect on the interrogation of the switch position of the power switch.

According to another feature of the invention, the sensor includes a DC decoupler and a signal former.

According to yet another feature of the invention, the sensor includes an optocoupler or an isolating transformer for providing a DC decoupling.

According to yet another feature of the invention, the sensor includes a signal former having a Schmitt trigger, a threshold circuit or a monoflop.

According to another feature of the invention, a sensor shift register is connected to the output of the sensor, the sensor shift register is interrogated by the microprocessor.

According to yet another feature of the invention, a sensor shift register is connected to the output of the sensor, an actuator shift register is connected to the sensor shift register, and a relay assembly is actuated by the actuator shift register for providing the switch-off delay, and a sensor/actuator control board is provided, the sensor, the sensor shift register, the actuator shift register, and the relay assembly are disposed on the sensor/actuator control board.

According to another feature of the invention, a third switch is connected in parallel to the power switch and is controlled by the microprocessor for providing the switch-off delay, and the first switch decouples the second switch from the third switch.

With the objects of the invention in view there is also provided, a microprocessor-controlled appliance, including:

a power switch having given switch positions and including a first switch and a second switch, the first switch being connected in series to the second switch;

the first switch and the second switch selectively opening and closing only jointly;

a sensor operatively connected to the microprocessor and having a first input, a second input, and an output;

the second input of the sensor to be connected to a first conductor selected from the group consisting of a first live conductor, a second live conductor, and a neutral conductor;

the second switch having a first contact and a second contact, the first contact to be connected to a second conductor selected from the group consisting of the first live conductor, the second live conductor, and the neutral conductor;

the second contact of the second switch being connected to the first input of the sensor for passing a measurement current to the first input of the sensor when a voltage is applied and the power switch is switched on; and a microprocessor operatively connected to the sensor, the output of the sensor transmitting an output signal corresponding to one of the switch positions of the power switch to the microprocessor.

With the objects of the invention in view there is further provided, a microprocessor-controlled franking machine, including:

a power switch having given switch positions and including a first switch and a second switch, the first switch being connected in series to the second switch;

the first switch and the second switch selectively opening and closing only jointly;

a sensor operatively connected to the microprocessor and having a first input, a second input, and an output;

the second input of the sensor to be connected to a first conductor selected from the group consisting of a first live conductor, a second live conductor, and a neutral conductor;

the second switch having a first contact and a second contact, the first contact to be connected to a second conductor selected from the group consisting of the first live conductor, the second live conductor, and the neutral conductor;

the second contact of the second switch being connected to the first input of the sensor for passing a measurement current to the first input of the sensor when a voltage is applied and the power switch is switched on;

a microprocessor operatively connected to the sensor, the output of the sensor transmitting an output signal corresponding to one of the switch positions of the power switch to the microprocessor; and a franking machine meter operatively connected to the microprocessor.

Other features which are considered as characteristic for the invention are set forth in the appended claims.

Although the invention is illustrated and described herein as embodied in a configuration for identifying the switch position of a power switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
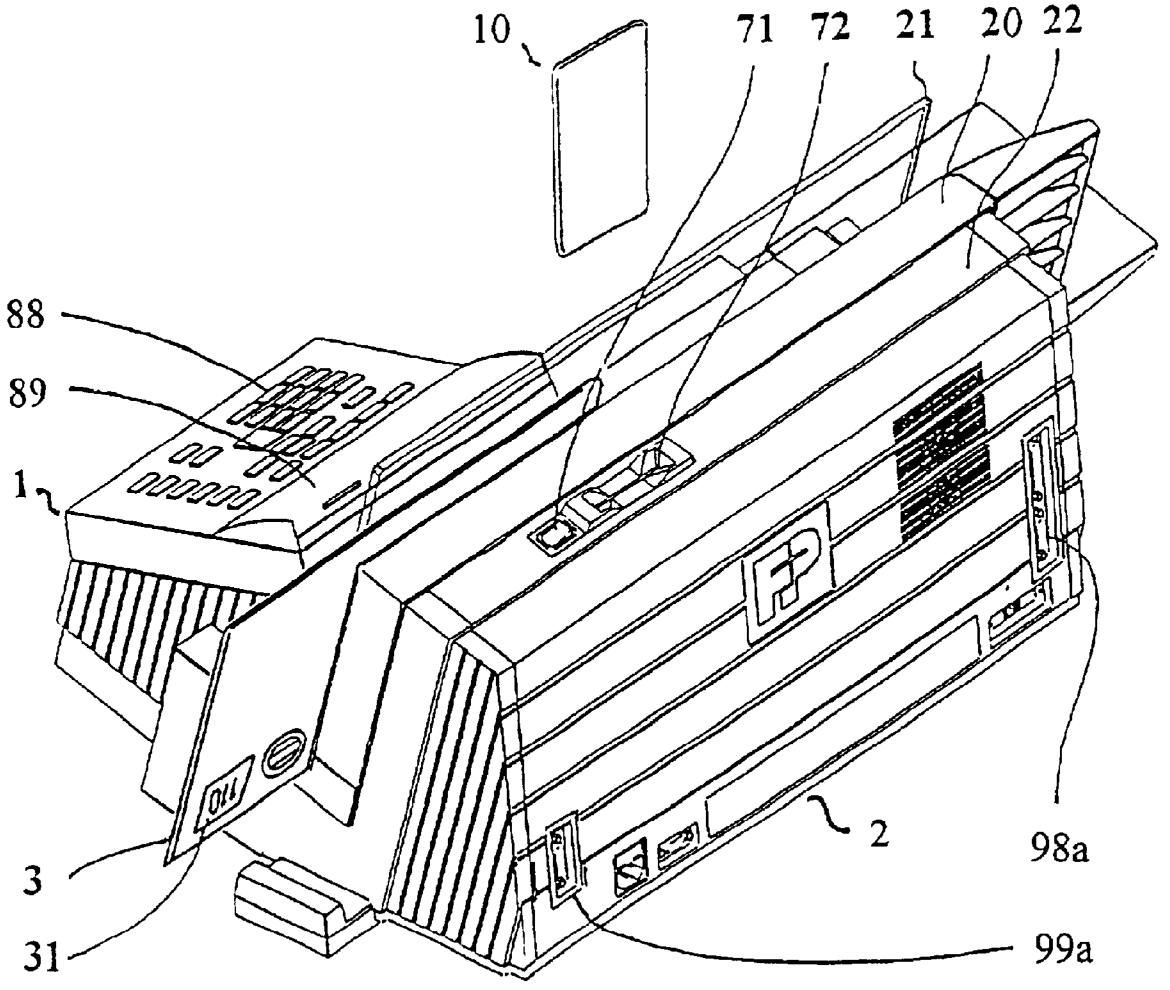
FIG. 1 is a perspective view of a franking machine according to the invention.

Referring now to the figures of the drawings in detail and first, particularly, to FIG. 1 thereof, there is shown a perspective rear view of a franking machine of the type which is known under the trademark name "JetMail®." The franking machine includes a meter 1 and a base 2. The operating elements 88 of a keyboard and display elements 89 in the screen of a display unit of the meter 1 form a user interface, which is configured for inputting. A further inputting device may be provided by a smartcard. The base 2 is equipped with a smartcard read/write unit, which is provided behind the guideplate 20 and is accessible from the upper edge of the housing 22. Once the franking machine has been switched on through the use of the power switch or mains switch 71, a smartcard 10 is inserted into the insertion slot 72, in the downward direction from above. A letter 3 which is fed in on edge and whose surface to be printed on rests on the guide plate then has a franking stamp 31 printed on it, corresponding to the input data. The letter feed opening is bounded at the side by a clear-view plate 21 and the guide plate 20. Further stations and/or appliances can be connected to the interfaces 98*a* and 99*a* in order to produce a communications link with the franking machine. Once the amount has been calculated in the mail registers, the mail rate is finally printed on the relevant item being dispatched—in this case the letter 3. The printing is carried out through the use of an ink-jet printing head. Opening the power switch 71 results first of all in measures for the protection of the printing head (not shown) against a drying out, before the power supply system is disconnected.

Figure 2:
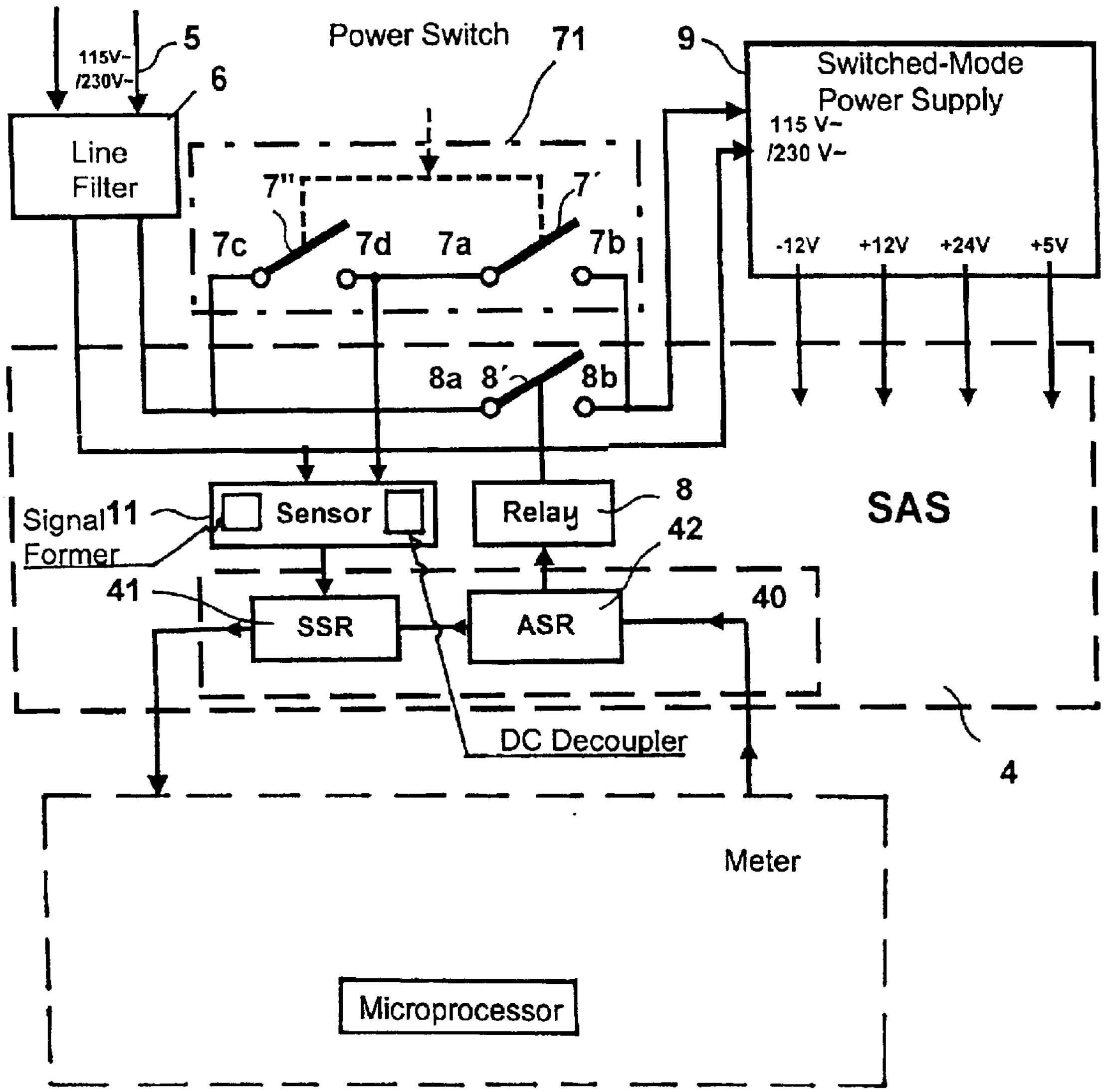
FIG. 2 is a block circuit diagram of a circuit part of a sensor/actuator control board of a franking machine according to the invention.

FIG. 2 shows a circuit part of a sensor/actuator control board (printed circuit board) SAS for a franking machine. A mains cable or power cable 5 is connected to a switched-mode power supply 9 via a mains filter or power line filter (e.g. surge protector) 6 and a power switch 71. The switched-mode power supply 9 produces the power supply for the JetMail® type franking machine. The two-pole power switch 71 is provided upstream of a transformer in the switched-mode power supply 9. The first switch 7' of the power switch has the contacts 7*a* and 7*b*, and the second switch 7" of the power switch has the contacts 7*c* and 7*d*. When a franking machine is switched on, the same current i(t) flows through all the switching contacts of the power switch 71, since the two switches 7' and 7" are connected in series.

The contact 7*c* of the second switch 7" of the power switch 71 is connected to the phase conductor at the power line filter 6, and the contact 7*d* is connected firstly to the contact 7*a* of the first switch 7' of the power switch 71, and secondly to a first input of the sensor 11. The second input of the sensor 11 is connected to the neutral conductor at the power line filter 6. The sensor may contain an optocoupler and a Schmitt trigger or a simpler threshold value switch, together with a monostable multivibrator (monoflop) as a signal forming device which, depending on the current flow through the optocoupler 11, emits an L or 0 signal on the output side, which is assessed as a bit. Bias resistors, which are not shown, are connected between the inputs of the sensor 11 and the inputs of the optocoupler. Current can flow via the inputs of the optocoupler only when the power switch 71 is closed. The sensor 11 and a sensor shift register (SSR) 41 connected on the output side are provided in order that the software in the processor of the JetMail® type franking machine can identify that the power switch has been switched off.

As an alternative to the optocoupler, an isolating transformer or transformers can, for example, be used, which reduce the measurement voltage to a conventional level for the downstream Schmitt trigger or the threshold value switch and the monoflop, so that it is still possible to use the normal supply voltage for TTL (Transistor-Transistor Logic) or MOSFET (Metal Oxide Semiconductor Field Effect Transistor) circuits.

A cleaning and sealing station (RDS) which is not shown here, may have various states, which can be interrogated by the microprocessor by using an interrogation device. A first state occurs after switch-on, when an ink-jet printing head is connected to the cleaning and sealing apparatus. The interrogation device has a slotted disc and two photosensors. The construction and method of operation of the cleaning and sealing station have been described in more detail in German Patent No. DE 197 26 642 C1, corresponding to U.S. Pat. No. 6,224,187 entitled: "Device for positioning an ink-jet print head and a cleaning and sealing device."

For example, when the interrogation device (not shown) in the cleaning and sealing station (RDS) (not shown) identify a first state, as a result the relay 8 is first of all actuated immediately before the transition to a second stage, and the relay switch 8' is thus closed. A second stage exists when the RDS is not connected to the ink-jet printing head. The relay 8 is not actuated any further until the printing head is once again connected to the cleaning and sealing station (RDS) (not shown), and the relay switch 8' is thus opened once more. A third state exists when the RDS is connected to the ink-jet printing head and the power switch is switched off. A fourth state exists when the RDS is connected to the ink-jet printing head and the power switch is still switched on. In that case, there is no need for a switch-off delay and the franking machine is switched off as soon as the power switch 71 is opened.

A relay switch 8' is provided in parallel with the power switch 71 in the mains input circuit of the JetMail® franking machine. The contact 7*b* of the power switch 71 is electrically connected to the contact 8*b* of the relay switch 8'. The contact 7*c* of the power switch 71 is electrically connected to the contact 8*a* of the relay switch 8'. When the contacts 8*a* and 8*b* are electrically connected to one another, the relay switch 8' bridges the series-connected switches 7' and 7" of the power switch 71 for a time period (second state) in which a cleaning and sealing station (RDS) is not connected to the printing head. When the RDS is not connected, opening the power switch results in the printing head being connected to the cleaning and sealing station (RDS) before the power supply is switched off via the relay 8. The relay switch 8' is opened (third state) for switching off. This thus does not take place until the RDS is connected to the printing head. The relay 8 is connected to a parallel output of the actuator shift register (ASR) 42 and, controlled by the software, is actuated via a transistor (not shown) in response to a bit supplied from the ASR. The relay 8 is preferably configured in the form of an assembly which already contains the above mentioned transistor.

The actuator shift register (ASR) 42 is a component of a register unit 40. The register unit 40 of a sensor/actuator control board (SAS) 4 may have a large number of actuator shift registers (ASR) and sensor shift registers (SSR). Further details can be found in U.S. Pat. No. 5,710,721 corresponding to European Patent Application No. EP 716 398 A2 which relates to a franking-machine-internal interface circuit, and a method for manipulation-resistant printing data control.

Alternatively, a microprocessor equipped with a multiplexer and analog/digital converter can also undertake a measured value interrogation of one of the sensors directly without a shift register chain and register unit, when such sensors are connected to the power switch 71 in the manner according to the invention. The sensor 11 for identification of the switch position in this case has at least one DC decoupler, and a threshold value circuit.

The invention is not limited to the above-described embodiment of a franking machine. It is feasible to use the basic idea of the invention for all types of appliances.

I claim:

1. In combination with a microprocessor-controlled appliance operating with a switch-off delay, a configuration for identifying a switch position, comprising:

a power switch having given switch positions and including a first switch and a second switch, said first switch being connected in series with said second switch;

said first switch and said second switch selectively opening and closing only jointly;

a sensor having a first input, a second input, and an output;

said second input of said sensor to be connected to a first conductor selected from the group consisting of a first live conductor, a second live conductor, and a neutral conductor;

said second switch having a first contact and a second contact, said first contact to be connected to a second conductor selected from the group consisting of the first live conductor, the second live conductor, and the neutral conductor;

said second contact of said second switch being connected to said first input of said sensor for passing a measurement current to said first input of said sensor when a voltage is applied and said power switch is switched on; and a microprocessor operatively connected to said sensor, said output of said sensor transmitting an output signal corresponding to one of the given switch positions of said power switch to said microprocessor.

2. The configuration according to claim 1, wherein said sensor includes a DC decoupler and a signal former.

3. The configuration according to claim 1, wherein said sensor includes an optocoupler for providing a DC decoupling.

4. The configuration according to claim 1, wherein said sensor contains an isolating transformer for providing a DC decoupling.

5. The configuration according to claim 1, wherein said sensor includes a signal former having a Schmitt trigger.

6. The configuration according to claim 1, wherein said sensor includes a signal former having a threshold circuit.

7. The configuration according to claim 1, wherein said sensor includes a signal former having a monoflop.

8. The configuration according to claim 1, including a sensor shift register connected to said output of said sensor, said sensor shift register being interrogated by the microprocessor.

9. The configuration according to claim 1, including:

a sensor shift register connected to said output of said sensor;

an actuator shift register connected to said sensor shift register; and a relay assembly actuated by said actuator shift register for providing the switch-off delay; and a sensor/actuator control board, said sensor, said sensor shift register, said actuator shift register, and said relay assembly being disposed on said sensor/actuator control board.

10. The configuration according to claim 1, including:

a third switch connected in parallel to said power switch and being controlled by said microprocessor for providing the switch-off delay; and said first switch decoupling said second switch from said third switch.

11. A microprocessor-controlled appliance, comprising:

a power switch having given switch positions and including a first switch and a second switch, said first switch being connected in series to said second switch;

said first switch and said second switch selectively opening and closing only jointly;

a sensor operatively connected to said microprocessor and having a first input, a second input, and an output;

said second input of said sensor to be connected to a first conductor selected from the group consisting of a first live conductor, a second live conductor, and a neutral conductor;

said second switch having a first contact and a second contact, said first contact to be connected to a second conductor selected from the group consisting of the first live conductor, the second live conductor, and the neutral conductor;

said second contact of said second switch being connected to said first input of said sensor for passing a measurement current to said first input of said sensor when a voltage is applied and said power switch is switched on; and a microprocessor operatively connected to said sensor, said output of said sensor transmitting an output signal corresponding to one of the switch positions of said power switch to said microprocessor.

12. A microprocessor-controlled franking machine, comprising:

a power switch having given switch positions and including a first switch and a second switch, said first switch being connected in series to said second switch;

said first switch and said second switch selectively opening and closing only jointly;

a sensor operatively connected to said microprocessor and having a first input, a second input, and an output;

said second input of said sensor to be connected to a first conductor selected from the group consisting of a first live conductor, a second live conductor, and a neutral conductor;

said second switch having a first contact and a second contact, said first contact to be connected to a second conductor selected from the group consisting of the first live conductor, the second live conductor, and the neutral conductor;

said second contact of said second switch being connected to said first input of said sensor for passing a measurement current to said first input of said sensor when a voltage is applied and said power switch is switched on;

a microprocessor operatively connected to said sensor, said output of said sensor transmitting an output signal corresponding to one of the switch positions of said power switch to said microprocessor; and a franking machine meter operatively connected to said microprocessor.

* * * * *